United States Patent
Shin

(10) Patent No.: US 9,636,999 B2
(45) Date of Patent: May 2, 2017

(54) IN-WHEEL ASSEMBLY AND VEHICLE WITH THE IN-WHEEL ASSEMBLY

(71) Applicant: HYUNDAI MOBIS CO., LTD., Seoul (KR)

(72) Inventor: Kyeong Ho Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/219,072

(22) Filed: Mar. 19, 2014

(65) Prior Publication Data

US 2015/0158381 A1    Jun. 11, 2015

(30) Foreign Application Priority Data

Dec. 10, 2013  (KR) .................. 10-2013-0153131

(51) Int. Cl.
*B60K 17/04* (2006.01)
*B60K 7/00* (2006.01)

(52) U.S. Cl.
CPC .......... *B60K 17/046* (2013.01); *B60K 7/0007* (2013.01); *B60K 2007/0038* (2013.01); *B60K 2007/0061* (2013.01)

(58) Field of Classification Search
CPC ..... B60K 17/14; B60K 17/145; B60K 17/046

USPC ........................................................ 475/149
See application file for complete search history.

(56) References Cited

U.S. PATENT DOCUMENTS

| | | | |
|---|---|---|---|
| 2010/0163319 A1* | 7/2010 | Murata et al. ................... | 180/55 |
| 2012/0181137 A1* | 7/2012 | Yamasaki et al. ........... | 192/84.6 |
| 2013/0012350 A1* | 1/2013 | Ebner ............................. | 475/149 |
| 2013/0288842 A1* | 10/2013 | Kim et al. ...................... | 475/149 |
| 2014/0128194 A1* | 5/2014 | Mair et al. ..................... | 475/149 |

FOREIGN PATENT DOCUMENTS

| | | | | |
|---|---|---|---|---|
| KR | 10-1994-0006326 A | | 3/1994 | |
| KR | 10-1060081 B1 | | 8/2011 | |
| KR | 10-1080664 B1 | | 11/2011 | |
| WO | WO2013013923 | * | 1/2013 | ............... B60K 7/00 |

OTHER PUBLICATIONS

Korean Office Action issued on Nov. 28, 2014 in corresponding Korean Application No. 10-2013-0153131 (6 pages, in Korean).

* cited by examiner

*Primary Examiner* — Stacey Fluhart

(74) *Attorney, Agent, or Firm* — NSIP Law

(57) ABSTRACT

Disclosed is an in-wheel drive system including a motor inside a wheel, in which the motor is disposed inside the wheel, with the center of the rotary shaft ahead of and above the center of the wheel, so it provides an effect of more freely designing the inside of the wheel.

11 Claims, 4 Drawing Sheets

IN-WHEEL ASSEMBLY AND VEHICLE WITH THE IN-WHEEL ASSEMBLY

CROSS-REFERENCE TO RELATED APPLICATIONS

This application claims priority to and the benefit of Korean Patent Application No. 10-2013-0153131 filed in the Korean Intellectual Property Office on Dec. 10, 2013, the entire contents of which are incorporated herein by reference.

TECHNICAL FIELD

The present invention relates to an in-wheel assembly and a vehicle with the in-wheel assembly, and more particularly to an in-wheel assembly with a reduction unit in a wheel and a vehicle with the in-wheel assembly.

BACKGROUND ART

An in-wheel drive system means a system that individually drives and brakes wheels, using a motor mounted inside each of the wheels. An in-wheel system operates a motor mounted on each wheel with a power converter. The in-wheel system has the advantage of being able to considerably contribute to improving safety and fuel efficiency of a vehicle, because it can perform posture control and regenerative braking of a vehicle.

In the in-wheel drive system, however, since a complicated planetary gear is disposed inside a hub bearing, a hub case is necessarily disposed outside the planetary gear to drive wheels and support loads. As a result, there is a problem in that it is required to manufacture a specific hub to use the in-wheel drive system and the in-wheel drive system is not compatible for the existing wheels.

Since secondary reduction is performed by the planetary gear, the capacity of the planetary gear needs to be increased in order to increase torque. However, because it is required to design the width, outer diameter, and the like of the planetary gear largely in order to increase the capacity of the planetary gear, the manufacturing cost increases.

A wheel assembly with an in-wheel motor has been disclosed in Korean Patent No. 10-1080664 (published on Nov. 8, 2011), where the direction of the helix angle, that is, the torsion angle of a counter gear at the left wheel is opposite to the direction of the torsion angle of the counter gear at the right wheel, while the direction of the torsion angle of the planetary gear at the left wheel is the same as the direction of the torsion angle of the planetary gear at the right wheel.

However, in the in-wheel drive assembly having this configuration, the counter gear at the left wheel and the counter gear at the right wheel are different parts with the directions of the torsion angles opposite to each other, resulting in increase in the number of gears.

SUMMARY OF THE INVENTION

The present invention has been made in an effort to provide an in-wheel assembly which allows for compact and very free design of the inside of a wheel, and a vehicle with the in-wheel assembly.

The present invention provides an in-wheel assembly compatible for the existing wheels without a specific hub, and a vehicle with the in-wheel assembly.

The present invention provides an in-wheel assembly that allows for reduction of the number of gears, and a vehicle with the in-wheel assembly.

An exemplary embodiment of the present invention provides an in-wheel drive system including a motor inside a wheel, in which the motor is disposed inside the wheel, with the center of the rotary shaft ahead of and above the center of the wheel.

In the wheel, a caliper may be disposed behind and above the center of the wheel, a strut may be disposed above the center of the wheel, a lower arm may be disposed under the center of the wheel, and a tie rod may be disposed behind and under the center of the wheel.

A first reduction unit may be connected to the rotor of the motor and a second reduction unit may be connected to the first reduction unit and a hub assembly, so they can transmit torque to the hub assembly.

The first reduction unit may include a sun gear fitted on the rotary shaft of the motor, at least two planetary gears engaged with the sun gear, a carrier supporting the planetary gears, and a ring gear which is formed around them and engaged with at least two planetary gears.

The sun gear may be spline-engaged with the rotary shat of the motor.

The ring gear may be supported by a knuckle fixed to a car body.

The second reduction unit may be a counter gear engaged with a drive gear engaged with the carrier.

The direction of the torsion angle of the planetary gear may be opposite to the direction of the torsion angle of the drive gear.

Radial and axial loads generated in engagement may be resisted by disposing bearings at both sides of the drive gear on the carrier.

In the bearings, a bearing (first bearing) with a large diameter is disposed between the carrier and the ring gear, at the motor side, and a second bearing smaller in diameter than the first bearing may be used for the hub side.

The second bearing may be used to make the first bearing support the resultant force of the thrust forces generated by the drive gear and the planetary gear.

The hub assembly may include a shaft integrally formed with the counter gear, a hub inner race spline-engaged with the shaft and fastened to a disc, and a hub outer race supporting the hub inner race rotatably.

The hub assembly may include balls between the hub inner race and outer race and appropriate pre-pressure may be applied to the balls by the tightening force of a hub nut after the hub assembly is combined with the shaft.

The hub outer race may be supported by a knuckle fixed to a car body.

The knuckle may be fixed to the car body through a strut and a lower arm.

The rotor of the motor may be rotatably supported by a double row bearing.

The double row bearing may be an angular bearing.

Another exemplary embodiment of the present invention for achieving the objects provides a vehicle including the in-wheel drive system.

According to an exemplary embodiment of the present invention, it is possible to more freely design the inside of a wheel by disposing a motor ahead of and above the center of a wheel and packaging the motor without interference with a caliper, a tie rod, and a lower arm.

According to an exemplary embodiment of the present invention, it is possible to minimize an increase in width and outer diameter of a planetary gear for increasing torque and to reduce the manufacturing cost through first reduction by connecting the planetary gear and the motor and second reduction by a counter gear.

According to an exemplary embodiment of the present invention, it is possible to use the system compatibly for the existing wheels, because the counter gear is connected to the hub assembly.

According to an exemplary embodiment of the present invention, it is possible to since the direction of the torsion angle of the planetary gear and the direction of the torsion angle of the drive gear engaged with the counter gear are opposite to each other in order to cancel out the thrust force generated by the planetary gear and the thrust force generated by the drive gear, it is possible to more freely design the bearings of a reduction unit and reduce the number of gears.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
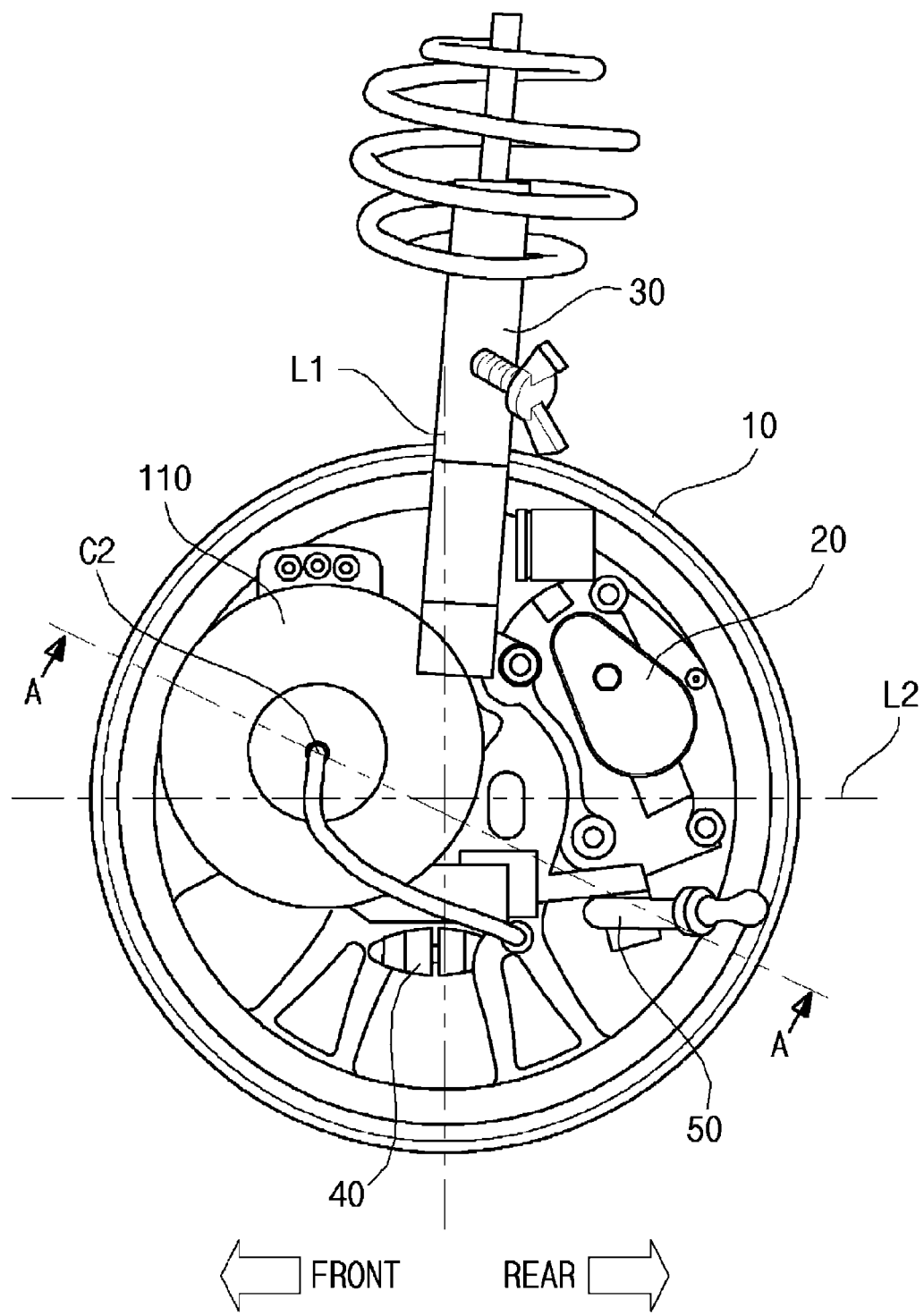
FIG. 1 is a view illustrating an in-wheel drive system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, embodiments of the present invention will be described in detail with reference to the accompanying drawings. First, in giving reference numerals to components throughout the drawings, it should be noted that like reference numerals designate like components even though the components are illustrated in different drawings. Although exemplary embodiments of the present invention will be described hereafter, the spirit of the present invention is not limited thereto and may be modified and implemented in various ways by those skilled in the art.

An in-wheel drive system includes a motor that generates a driving force, a cooler that cools the motor, a reduction unit that transmits a driving force to a wheel, a brake system that generates a braking force, a steering system that steers a vehicle, and a suspension system that supports the wheel against the vehicle. There is a need of a technology of integrating the joints of the components and merging their functions to disposing them inside a wheel.

In the present invention, an in-wheel motor is disposed inside a wheel, the in-wheel motor is positioned at the upper end ahead of an axle, which is the central axis of the wheel, to drive a vehicle, and then is packed without interfering with a caliper, a tie rod, and a lower arm. A planetary gear is disposed in the motor and performs primary reduction, a counter gear inside a knuckle performs secondary reduction and minimizes an increase in width direction, and the existing wheel can be used as they are by a third generation hub. The helix angles of a counter gear engaged with the carrier of a reduction unit ASSY (Assembly) and the planetary gear are made opposite to each other and a thrust load is offset, such that the reduction unit ASSY is used in the same way even if the directions of the thrust loads at the left wheel and the right wheel are different.

Figure 2:
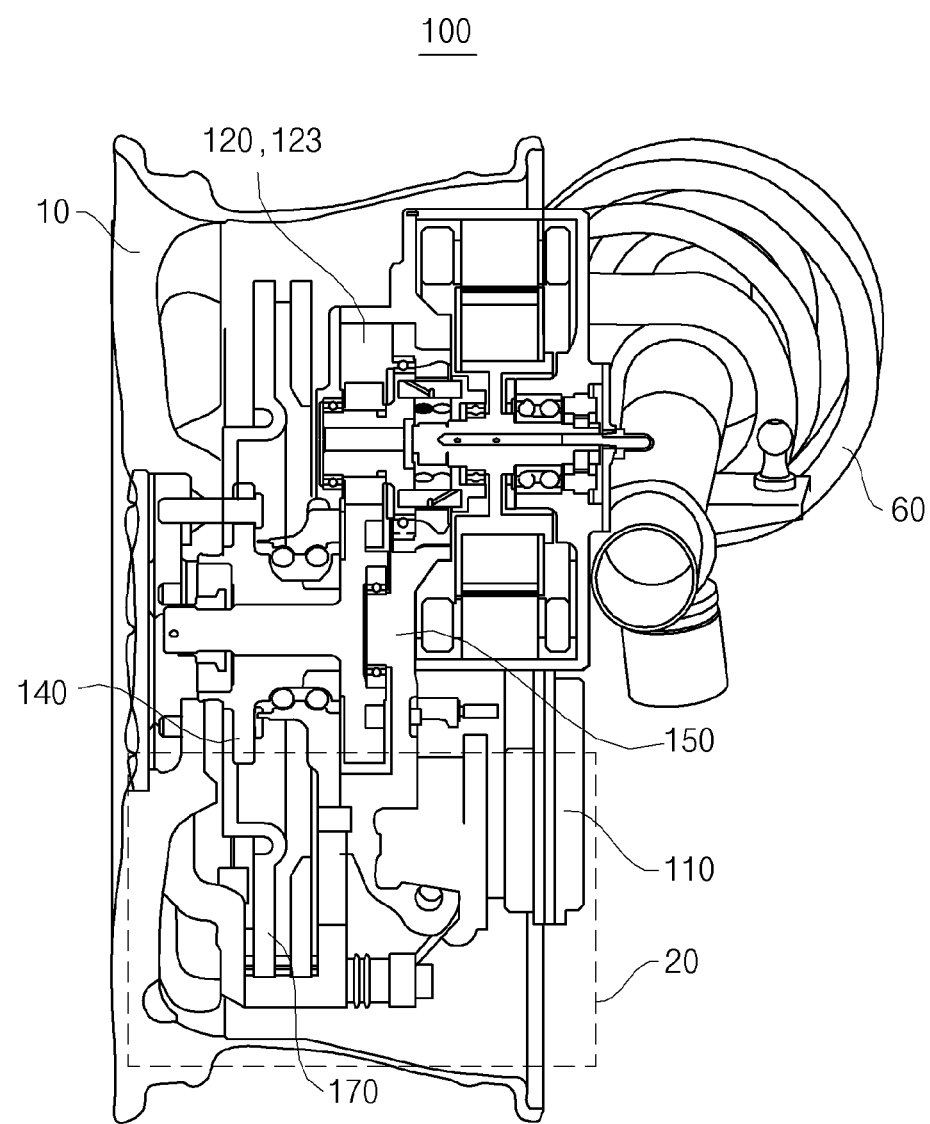
FIG. 2 is a view illustrating the cross-section of the in-wheel drive system taken along line A-A in FIG. 1.

FIG. 1 is a view illustrating an in-wheel drive system according to an exemplary embodiment of the present invention and FIG. 2 is a view illustrating the cross-section of the in-wheel drive system taken along line A-A in FIG. 1.

In the present invention, the reason that the position of the motor is determined in this way is for maximizing the size of the motor without interference with the chassis even if the wheel vertically bounces in running or turns by the steering angle in turning. A space that is not occupied by the motor, corresponding to the amount of offset of the motor, is generated at the rear and lower portion inside the wheel, as illustrated in FIG. 1. Accordingly, a suspension is more freely disposed at the lower portion. As illustrated in FIG. 1, a brake caliper 20 can be easily disposed opposite the side where the motor is offset, inside the wheel.

Therefore, in the configuration of the system of the present invention, the center of the motor is positioned at a predetermined distance ahead of and above the center of the axle, as illustrated in FIG. 1, when seen to the direction of outside from the inside of a vehicle, the caliper 20 is positioned behind and above the center of the axle, and a strut mount, a mount for a lower arm 40, and a tie rod 50 are disposed above, under, and behind and under the center of the axle, respectively.

Referring to FIGS. 1 and 2, in an in-wheel drive system 100 according to an exemplary embodiment of the present invention, a motor 110 may be disposed inside a wheel 10, with the center C2 of the rotational axis ahead of and above the center C1 of the wheel 10.

That is, the motor 110 may be positioned inside the wheel 10, with the center C2 of the rotational axis ahead of a vertical reference line L1 (at the front portion of a vehicle) which passes the center C1 of the wheel 10. The motor 110 may be positioned inside the wheel 10, with the center C2 of the rotational axis above a horizontal reference line L2 passing the center C1 of the wheel 10.

The reason that the position of the motor 110 is determined in this way is for maximizing the size of the motor 110 without interference with the chassis even if the wheel 10 vertically bounces in running or turns by the steering angle in turning.

As the motor 110 is offset forward and upward, a space is defined at the rear and lower portion inside the wheel 10. Accordingly, the suspension 60 can be more freely disposed at the lower portion in the wheel 10.

The caliper 20 may be disposed behind the vertical reference line L1 (at the rear portion of the vehicle) and above the horizontal reference line L2, inside the wheel 10.

A strut 30 may be disposed above the horizontal reference line L2.

A lower arm 40 may be disposed under the horizontal reference line L2.

A tie rod 50 may be disposed behind the vertical reference line L1 (at the rear portion of the vehicle) and under the horizontal reference line L2, inside the wheel 10.

Therefore, the motor 110 can be packed inside the wheel 10 without interference with the caliper 20, the lower arm 40, and the tie rod 50.

Figure 3:
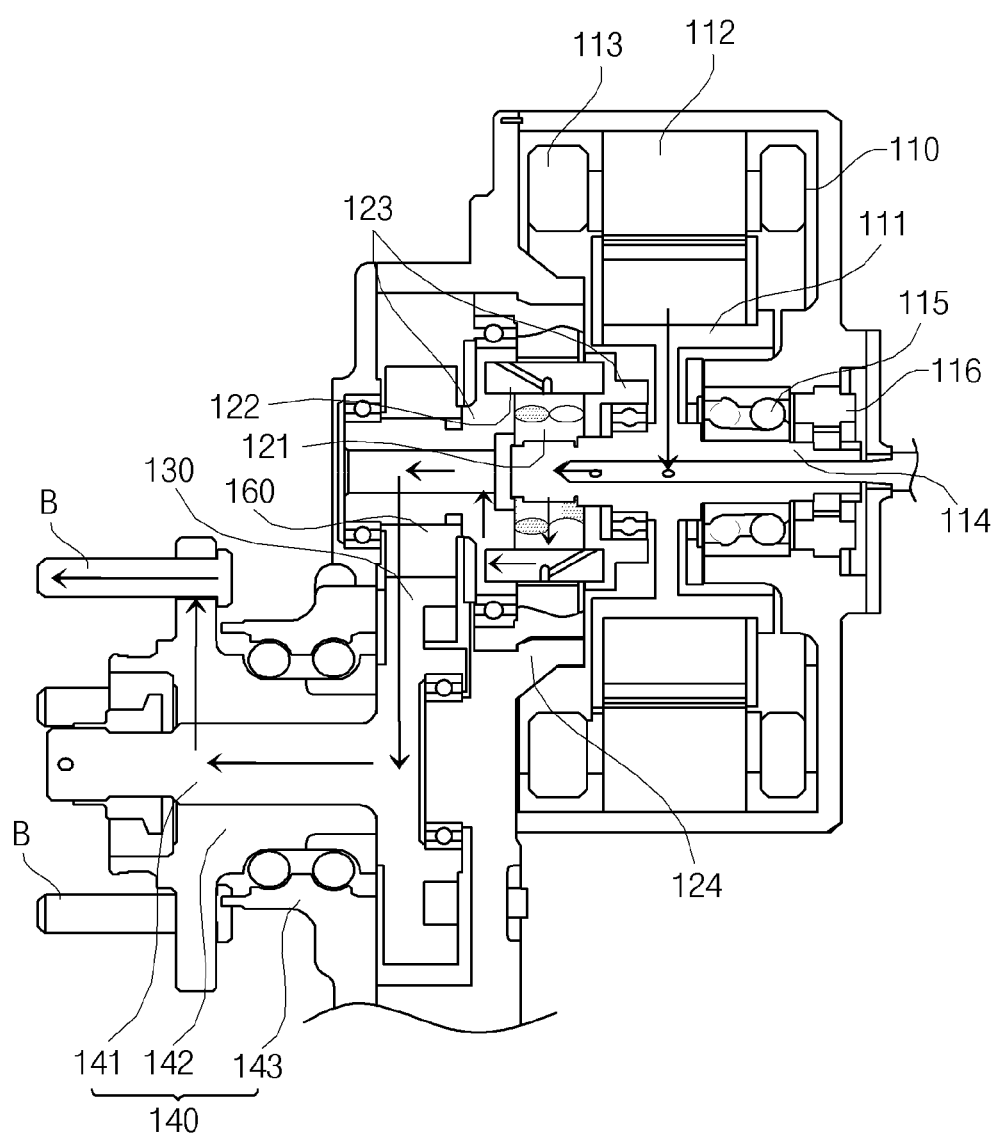
FIG. 3 is a view illustrating a process of power transmission in the in-wheel drive system illustrated in FIG. 1.

FIG. 3 is a view illustrating a process of power transmission in the in-wheel drive system illustrated in FIG. 1.

A rotor 111, a power transmission shaft, is in the motor, as in the cross-section taken along line A-A in FIG. 2, and in operation, primary reduction is performed by a sun gear 121 fitted on the end portion of the rotor, a planetary gear 122 engaged with the sun gear, and a carrier 123 supporting the planetary gear.

Secondary reduction is performed by a drive gear 160 spline-engaged with the carrier and a counter gear 130 engaged with the gear.

As a hub inner race 142 spline-engaged with a shaft integrated with the counter gear a disc 170 fastened to the hub inner race by hub bolts, and the wheel are rotated, the vehicle is driven.

A hub outer race 143 supporting the hub inner race with two balls and a knuckle 150 supporting the hub outer race are coupled to the car body through the strut and the lower arm 140 and support the vehicle that is in motion.

In braking, the caliper 20 supported by the knuckle against the disc rotating with the wheel generates a friction force and braking is performed, while the tie rod 50 generating a steering angle on the wheel is connected to the knuckle and steering is performed.

Referring to FIGS. 1 to 3, in the in-wheel drive system 100 according to an exemplary embodiment, a first reduction unit 120 may be connected to the rotary shaft of the motor 110 and a second reduction unit 130 may be connected to the first reduction unit 120 and a hub assembly 140.

In detail, the first reduction unit 120 may include a sun gear 121, planetary gears 122, a carrier 123, and a ring gear 124.

The sun gear 121 may be spline-engaged with the rotary shaft 114 of the rotor 111 of the motor 110. A plurality of planetary gears 122 receives torque from the sun gear 121 in mesh with the sun gear 121 around it. The carrier 123 supports the planetary gear 122. The ring gear 124 is engaged with the planetary gears 122 around them. The ring gear 124 is supported by the knuckle 150 fixed to the car body.

As the rotary shaft 114 of the motor 110 rotates, the sun gear 121 connected to the rotary shaft 114 rotates. By the rotation of the sun gear 121, the planetary gears 122 rotate and revolve around the sun gear 121. The carrier 123 supporting the planetary gears 122 rotates with the rotation of the planetary gears 122, so the primary reduction is performed.

The second reduction unit 130 may be a counter gear 130 engaged with the drive gear 160 engaged with the carrier 123.

As the carrier 123 rotates, the drive gear 160 engaged with the carrier 123 rotates and the counter gear 130 engaged with the drive gear 160 rotates, so the secondary reduction is performed and torque increases.

The torque of the counter gear 130 is transmitted to the hub assembly 140.

The hub assembly 140 may include the shaft 141, the hub inner race 142, and the hub outer race 143. The shaft 141 may be integrally formed with the counter gear 130. The hub inner race 142 is tightened by a hub nut after fitted on the shaft 141 and may be fastened to the disc 170. The hub inner race 142 is coupled to the wheel 10 by a bolt B. The hub outer race 143 supports the hub inner race 142 rotatably. The hub outer race 143 can be supported by the knuckle 150. The knuckle 150 can be coupled to the car body through the strut 30 and the lower arm 40.

As the counter gear 130 rotates, the hub inner race 142 rotates and the wheel 10 rotates accordingly.

The caliper 20 is in friction contact with the disc 170 rotating with the wheel 10, so braking is performed. The caliper 20 is supported by the knuckle 150. The direction of the wheel 10 is controlled by the tie rod 50 connected to the knuckle 150.

The reduction gears of the transmissions in common vehicles have a torsion angle for preventing noise. In-wheel drive systems require the reduction units described above at the left wheel and the right wheel and need many gears for reduction of two or more steps. Accordingly, using the same gears for the left wheel and the right wheel is advantageous for reducing the costs with a simple manufacturing process. To this end, gears with the same direction of a torsion angle may be used for the left wheel and the right wheel, respectively.

However, since the torsion angle of a gear generates a thrust force, the thrust forces generated in the same direction of a torsion angle may cause a large load on a bearing. It is required to increase the diameter of a bearing in order to increase the lifespan of the bearing, but there is a problem in that it is impossible to increase the diameter of a bearing in order to secure the maximum allowable rotation speed.

In the present invention, the planetary gear and the drive gear are engaged with the carrier, with the directions of their helix angles opposite to each other, and both ends of the drive gear are supported by bearings with different diameters.

The thrust forces generated by the planetary gear and the drive gear and transmitted to the carrier cancel out, such that the thrust force transmitted to the inside of the motor is significantly reduced.

The resultant force of the two thrust forces may be resisted by a bearing with a relatively larger diameter.

Accordingly, the bearing in the reduction unit has no problem with the lifespan even if it is designed in consideration of only the maximum allowable rotation speed, such that the bearing for the reduction unit can be designed better.

Since the thrust forces are canceled out in the reduction unit, the same gears can be used for the left wheel and the right wheel, thereby reducing the number of gears.

Figure 4:
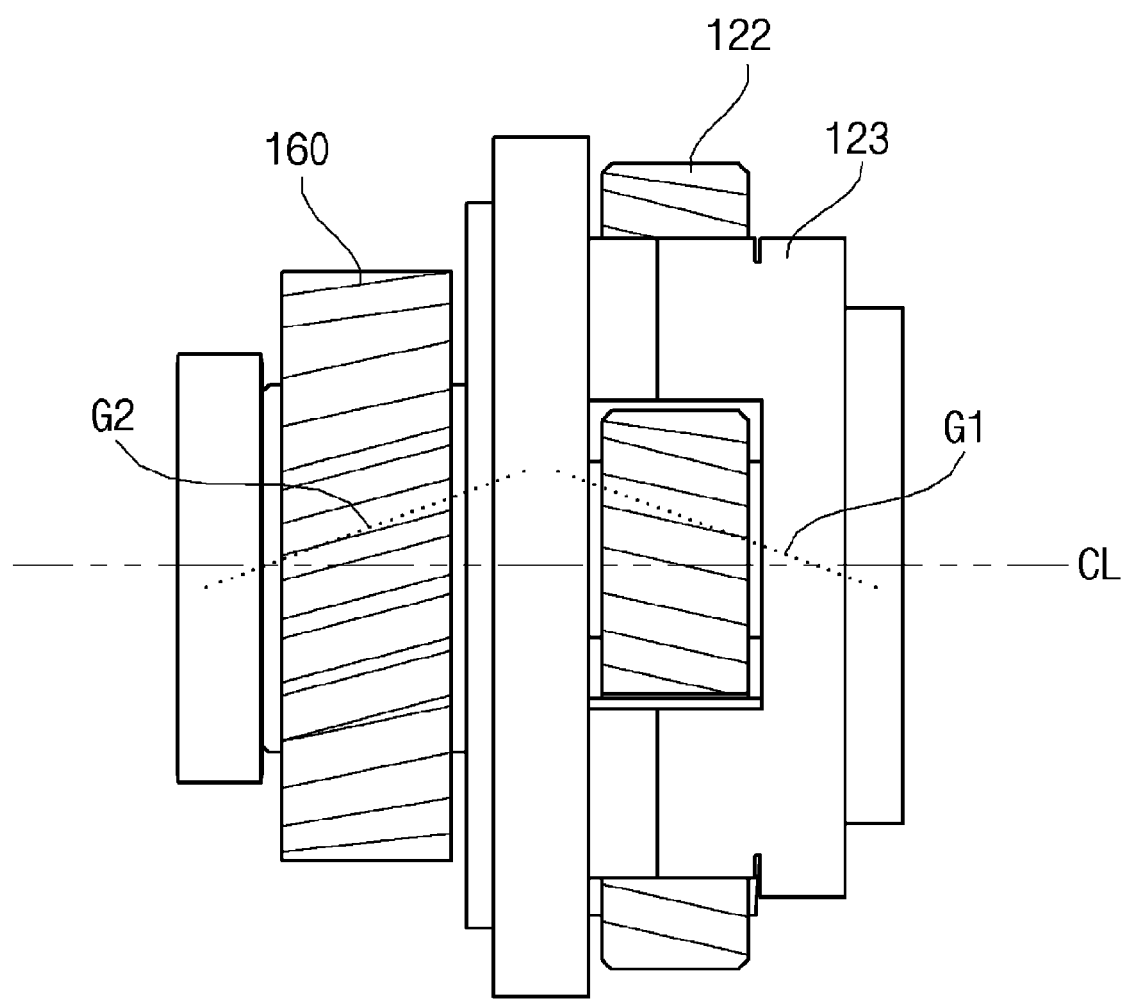
FIG. 4 is a view illustrating the direction of the torsion angle of a planetary gear and the direction of the torsion angle of a drive gear.

FIG. 4 is a view illustrating the direction of the torsion angle of a planetary gear and the direction of the torsion angle of a drive gear.

In the in-wheel drive system 100 according to an exemplary embodiment of the present invention, in order to solve the problem, the direction G1 of the torsion angle (helix angle) of the planetary gear 122 is made opposite to the direction G2 of the torsion angle of the drive gear 160, as illustrated in FIG. 4. Accordingly, the thrust force generated by the planetary gear 122 and the thrust force generated by the drive gear 160 are canceled out by the carrier 123, so the thrust force is greatly reduced.

Therefore, it is possible to consider only the maximum allowable rotation speed in design of a bearing for supporting a drive gear, so the bearing can be designed better. Since the thrust forces are canceled out inside the wheel 10, it is possible to reduce the number of gears by using the same reduction unit for the left wheel and the right wheel.

Meanwhile, the rotor 111 of the motor 110 can be rotatably supported by a double row bearing 115. The double row bearing 115, an angular bearing, can resist the thrust force generated by the sun gear regardless of the direction. A resolver 116 is disposed on the double row bearing 115 and transmits the information on the rotation of the motor 110 to an inverter. A stator 112 is disposed around the rotor 111 and a coil 113 is wound on the stator 112.

In the present invention, the motor, knuckle, planetary gear set, drive gear, counter gear, hub assembly, and disc are assembled in this order.

The motor includes the stator core 112, the stator coil 113, and the rotor 111. When the motor is a three-phase motor, the stator coil may be a U-shaped coil, a V-shaped coil, or a W-shaped coil.

The rotor 111 is disposed inside the stator core or the stator coil and rotatably supported by a motor cover through the double angular ball bearing 115.

The resolver 116 is disposed behind the ball bearing and transmits the position information for motor control to the inverter.

The torque outputted from the rotor 111 is transmitted to the wheel through a reduction mechanism. The reduction mechanism includes a planetary gear set and a counter gear and performs 2-step reduction.

As illustrated in the cross-section taken along line A-A in FIG. 2, the planetary gear set is disposed outside the vehicle further than the motor in the tire/wheel assembly.

The planetary gear set is disposed on the same axis with the center of the motor and includes a sun gear, a planetary gear, a planetary carrier, and a ring gear.

The sun gear 121 is spline-engaged with the rotor 111 and the ring gear 124 is fixed to the knuckle by bolts, so reduction is performed through the carrier.

The carrier is composed of three bearings and supported by a reduction cover integrally formed with the rotor 111, the ring gear 124, and the hub outer race 143.

The counter gear set is disposed outside the vehicle further than the first planetary gear. The counter gear set includes a gear 160 having a small diameter and disposed on the outer carrier of the first planetary gear and a counter gear 130 having a large diameter and engaged with the drive gear.

The drive gear with a small diameter is fitted on the carrier by splines.

The counter gear with a large diameter is supported by a bearing at the knuckle side and fixed by a hub nut with the shaft spline-engaged with the hub inner race 142 at the hub side.

The inner race member of the hub is spline-engaged with the shaft of the counter gear and transmits increased torque to the wheel. The outer race member is disposed outside the inner race member around it, and is fixed to the knuckle by bolts and supports the inner race member.

The reduction cover is integrated with the outer race member and coupled to the knuckle and is sealed to prevent the oil in the reduction unit from leaking.

A seal is provided between the knuckle and the motor housing too and prevent the oil in the motor from leaking.

An in-wheel drive system according to an exemplary embodiment of the present invention was described in detail above with reference to the accompanying drawings.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An in-wheel assembly configured to be disposed within a wheel of a vehicle, and comprising:
   an in-wheel motor;
   a counter gear mechanism;
   a hub assembly comprising a hub shaft integrally formed with the counter gear mechanism;
   a planetary gear set;
   first and second bearings supporting both sides of a carrier engaged with a drive gear of the counter gear mechanism;
   a ring gear engaged with a planetary gear of the planetary gear set and supported by a knuckle;
   a third bearing disposed between a hub outer race of a lower arm and a hub inner race of the lower arm; and
   a fourth bearing disposed between the ring gear and a counter gear of the counter gear mechanism,
   wherein the first bearing comprises a larger diameter than the second bearing and is disposed closer to the vehicle than the second bearing,
   wherein a helix angle of the drive gear is opposite to a helix angle of the planetary gear,
   wherein the drive gear is axially spaced apart from the planetary gear, and
   wherein an inner diameter of the third bearing is larger than an inner diameter of the fourth bearing.

2. The in-wheel assembly of claim 1, further comprising:
   an oil pump configured to supply oil and disposed between the in-wheel motor and the knuckle in a width direction of the vehicle, between a tie rod and the in-wheel motor in a front-rear direction, and in a space between the lower arm and a strut in the up-down direction.

3. The in-wheel assembly of claim 2, wherein the oil flows through a hole formed in a rotary shaft of the in-wheel motor and is supplied to a bearing inside the planetary gear through a channel in a shaft supporting the carrier and the planetary gear.

4. The in-wheel assembly of claim 1, wherein an output shaft of the in-wheel motor is above a center of an axle of the vehicle with respect to ground and closer to a front of the vehicle than the axle.

5. The in-wheel assembly of claim 1, wherein each of the in-wheel motor, the counter gear mechanism, the planetary gear set, and the bearings are disposed within a periphery of the wheel.

6. An in-wheel assembly configured to be disposed within a wheel of a vehicle, and comprising:
   an in-wheel motor;
   a counter gear mechanism comprising a drive gear;

a hub assembly comprising a hub shaft integrally formed with the counter gear mechanism;
a planetary gear set and carrier;
first and second bearings supporting the carrier, the first bearing being disposed farther from the vehicle than the second bearing and having a smaller diameter than the second bearing;
a ring gear engaged with the planetary gear set and supported by a knuckle;
a third bearing disposed between a hub outer race of a lower arm and a hub inner race of the lower arm; and
a fourth bearing disposed between the ring gear and a counter gear of the counter gear mechanism,
wherein a helix angle of the drive gear is opposite to a helix angle of a planetary gear of the planetary gear set,
wherein the drive gear is axially spaced apart from the planetary gear, and
wherein an inner diameter of the third bearing is larger than an inner diameter of the fourth bearing.

7. A vehicle comprising:
an in-wheel assembly, comprising:
  a motor;
  a counter gear mechanism comprising a drive gear;
  a hub assembly comprising a hub shaft integrally formed with the counter gear mechanism;
  a planetary gear set;
  a carrier supporting the planetary gear set;
  first and second bearings supporting the carrier, the first bearing being disposed farther from the vehicle than the second bearing and having a smaller diameter than the second bearing;
  a ring gear engaged with the planetary gear set and supported by a knuckle;
  a third bearing disposed between a hub outer race of a lower arm and a hub inner race of the lower arm; and
  a fourth bearing disposed between the ring gear and a counter gear of the counter gear mechanism,
  wherein a helix angle of the drive gear is opposite to a helix angle of a planetary gear of the planetary gear set,
  wherein the drive gear is axially spaced apart from the planetary gear, and
  wherein an inner diameter of the third bearing is larger than an inner diameter of the fourth bearing.

8. The vehicle of claim 7, wherein
the bearings distal to the vehicle are symmetrical at a left wheel and a right wheel, and
the bearings proximate to the vehicle are symmetrical at the left wheel and the right wheel.

9. The vehicle of claim 7, further comprising:
an oil pump configured to supply oil and disposed between the in-wheel motor and the knuckle in the width direction of the vehicle, between a tie rod and the in-wheel motor in a front-rear direction, and in a space between the lower arm and a strut in an up-down direction.

10. The vehicle of claim 9, wherein the oil flows through a hole formed in a rotary shaft of the in-wheel motor and is supplied to a bearing inside the planetary gear through a channel in a shaft supporting the carrier and the planetary gear.

11. The vehicle of claim 7, wherein an output shaft of the in-wheel motor is offset above a center of an axle of the vehicle with respect to ground and is located closer to a front of the vehicle than the axle.

* * * * *